United States Patent
Bao

(10) Patent No.: US 10,326,713 B2
(45) Date of Patent: Jun. 18, 2019

(54) DATA ENQUEUING METHOD, DATA DEQUEUING METHOD, AND QUEUE MANAGEMENT CIRCUIT

(71) Applicant: HUAWEI TECHNOLOGIES CO., LTD., Shenzhen (CN)

(72) Inventor: Yalin Bao, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/883,465

(22) Filed: Jan. 30, 2018

(65) Prior Publication Data

US 2018/0159802 A1 Jun. 7, 2018

Related U.S. Application Data

(63) Continuation of application No. PCT/CN2016/092055, filed on Jul. 28, 2016.

(30) Foreign Application Priority Data

Jul. 30, 2015 (CN) .......................... 2015 1 0459221

(51) Int. Cl.
*H04L 12/861* (2013.01)
*H04L 12/721* (2013.01)
(Continued)

(52) U.S. Cl.
CPC ........ *H04L 49/9036* (2013.01); *H04L 45/566* (2013.01); *H04L 45/60* (2013.01);
(Continued)

(58) Field of Classification Search
CPC ............. H04L 49/9036; H04L 49/9042; H04L 49/901; H04L 49/9021; H04L 45/566;
(Continued)

(56) References Cited

U.S. PATENT DOCUMENTS 9,262,554 B1* 2/2016 Bailey ............... G06F 16/90344
2002/0061027 A1 5/2002 Abiru et al.
(Continued)

FOREIGN PATENT DOCUMENTS

CN 101009646 A 8/2007
CN 101179486 A 5/2008
(Continued)

OTHER PUBLICATIONS

First Office Action issued in corresponding Chinese Patent Application No. 201510459221.X, dated Oct. 20, 2017, 5 pages.
(Continued)

*Primary Examiner* — Warner Wong
(74) *Attorney, Agent, or Firm* — Conley Rose, P.C.

(57) ABSTRACT

The disclosure describes a data enqueuing method. The method may include: receiving a to-be-enqueued data packet, dividing the data packet into several slices to obtain slice information of the slices, and marking a tail slice of the data packet with a tail slice identifier; enqueuing corresponding slice information according to an order of the slices in the data packet, and in a process of enqueuing the corresponding slice information, if a slice is marked with the tail slice identifier, determining that the slice is the tail slice of the data packet, and generating a first-type node; and determining whether a target queue is empty, and if the target queue is empty, writing slice information of the tail slice into the target queue, and updating a head pointer of a queue head list according to the first-type node.

19 Claims, 5 Drawing Sheets

(51) Int. Cl.
*H04L 12/873* (2013.01)
*H04L 12/773* (2013.01)
*H04L 12/879* (2013.01)
*H04L 12/883* (2013.01)
*H04L 12/70* (2013.01)

(52) U.S. Cl.
CPC ............ *H04L 47/52* (2013.01); *H04L 49/901* (2013.01); *H04L 49/9021* (2013.01); *H04L 49/9042* (2013.01); *H04L 2012/5681* (2013.01)

(58) Field of Classification Search
CPC ......... H04L 47/50; H04L 47/52; H04L 47/58; H04L 47/62; H04L 47/622; H04L 47/628; H04L 47/6295; H04L 2012/5681; H04L 49/3018; H04L 49/3027; H04L 49/3036; H04L 49/3045; H04L 49/90–9094; G06F 3/126; G06F 5/065; G06F 5/08; G06F 7/785; G06F 2207/226; G06F 2209/548
See application file for complete search history.

(56) References Cited

U.S. PATENT DOCUMENTS

| | | | | |
|---|---|---|---|---|
| 2004/0218592 | A1* | 11/2004 | Nagar | H04L 49/90 370/381 |
| 2005/0286526 | A1* | 12/2005 | Sood | H04L 47/10 370/394 |
| 2007/0121499 | A1 | 5/2007 | Pal et al. | |
| 2007/0133531 | A1 | 6/2007 | Kodama et al. | |
| 2007/0174411 | A1* | 7/2007 | Brokenshire | G06F 15/17337 709/213 |
| 2014/0281083 | A1* | 9/2014 | Canepa | G06F 13/364 710/112 |
| 2016/0103783 | A1* | 4/2016 | Allen | H04L 12/6418 709/212 |
| 2016/0294735 | A1* | 10/2016 | Panchagnula | H04L 49/9005 |
| 2017/0147251 | A1* | 5/2017 | Lu | G06F 3/0604 |

FOREIGN PATENT DOCUMENTS

| | | |
|---|---|---|
| CN | 102377682 A | 3/2012 |
| CN | 102437929 A | 5/2012 |
| CN | 103220230 A | 7/2013 |
| CN | 103530130 A | 1/2014 |
| CN | 103546392 A | 1/2014 |
| CN | 103581055 A | 2/2014 |
| CN | 105162724 A | 12/2015 |

OTHER PUBLICATIONS

Notice of Allowance issued in corresponding Chinese Patent Application No. 201510459221.X, dated Jan. 22, 2018, 4 pages.

International Search Report and Written Opinion (including English translation) issued in corresponding International Application No. PCT/CN2016/092055, dated Oct. 25, 2016, 21 pages.

* cited by examiner

DATA ENQUEUING METHOD, DATA DEQUEUING METHOD, AND QUEUE MANAGEMENT CIRCUIT

CROSS-REFERENCE TO RELATED APPLICATIONS

This application is a continuation of International Application No. PCT/CN2016/092055, filed on Jul. 28, 2016, which claims priority to Chinese Patent Application No. 201510459221.X, filed on Jul. 30, 2015, both of which are hereby incorporated by reference in their entireties.

TECHNICAL FIELD

The present disclosure relates to the field of communications technologies, and in particular, to a data enqueuing method, a data dequeuing method, and a queue management circuit.

BACKGROUND

Queue management (QM) is a common function of a communications processing chip, and is mainly used for managing a data packet by using a buffer address. Because the communications processing chip needs to process a relatively large quantity of services, during queue management, a queue is generally established in a shared buffer according to a service type. When a data packet arrives, a buffer address is allocated to the arrived data packet in a memory, and then a packet descriptor (PCD) including the buffer address is written into the queue according to a type for management. Because data packets of different types arrive in a staggered manner, it cannot be ensured that buffer addresses of data packets of a same type in the memory are contiguous, and it cannot be ensured that buffer addresses of packet descriptors of the data packets in the buffer are contiguous, either. Therefore, a queue linked sublist needs to be generated for each queue, and packet descriptors of data packets that belong to a same queue are linked in the queue linked sublist. Specifically, in addition to the queue and the queue linked sublist, a queue head list and a queue tail list are established. A pointer of the queue head list points to a buffer address of the first packet descriptor in the queue, and a pointer of the queue tail list points to a buffer address of the last packet descriptor in the queue. Furthermore, buffer addresses of packet descriptors in the queue are linked in the queue linked sublist. To enqueue a data packet, if a queue is not empty, a packet descriptor is written into the queue and a buffer address of the packet descriptor is written into a queue linked sublist. To dequeue a data packet, a pointer of a queue head list is read, a packet descriptor is read from a queue according to a buffer address to which the pointer of the queue head list points, then a data packet is read from a memory according to a buffer address in the packet descriptor and is sent to a corresponding Media Access Control (MAC) port for transmission, and a buffer address of a next packet descriptor is read from a queue linked sublist, so as to update the pointer of the queue head list.

Because some data packets are relatively large but a bandwidth of a MAC port is limited, to avoid a data burst caused by difficulty in transmitting a relatively large data packet because of an extremely low bandwidth of a MAC port, in existing queue management, a data packet is first divided into several slices, and then one buffer address is allocated to each slice in a memory. During enqueuing, slice information of a slice is enqueued for management instead of a packet descriptor. During dequeuing, a pointer of a queue head list is read, slice information is read from a queue according to a buffer address to which the pointer of the queue head list points, then a slice is read from a memory according to a buffer address in the slice information and is sent to a corresponding MAC port for transmission, and a buffer address of a next piece of slice information is read from a queue linked sublist, so as to update the pointer of the queue head list. However, because of a macro restriction of a MAC port on a communications processing chip, it is required that the communications processing chip sends a slice to the MAC port according to priorities of queues, and the MAC port transmits the slice according to the priorities. When dequeuing is performed in a unit of a data packet, a priority scheduling policy is that priority determining and priority switching may be performed after dequeuing of each data packet is completed. However, when dequeuing is performed in a unit of a slice, if the priority scheduling policy for performing dequeuing in a unit of a data packet is used, priority determining and priority switching are performed after dequeuing of each slice is completed, which is inconsistent with entire-packet dequeuing; or when entire-packet dequeuing is performed, an existing priority scheduling policy cannot be implemented. Consequently, when dequeuing is performed in a unit of a slice, it is difficult to perform priority processing within a same MAC port based on the existing priority scheduling policy.

SUMMARY

Embodiments of the present disclosure provide a data enqueuing method, a data dequeuing method, and a queue management circuit, so as to implement, on the basis of entire-packet dequeuing, slice dequeuing and slice transmission within a same communications port according to a priority.

A first aspect of the present disclosure provides a data enqueuing method, applied to a queue management circuit in a queue management system of a communications processing chip, where several queues, a queue head list, a queue tail list, and a total queue linked list are established in the queue management system, the total queue linked list includes several queue linked sublists, each queue is corresponding to a queue head list, a queue tail list, and a queue linked sublist, the queue head list includes at least a head pointer, and the queue tail list includes at least a tail pointer; several communications ports are further disposed on the communications processing chip, and each communications port is corresponding to at least two queues; and the method may include:

receiving a to-be-enqueued data packet, dividing the data packet into several slices to obtain slice information of the slices, and marking a tail slice of the data packet with a tail slice identifier, where the slice information includes at least a port number, a priority, and a buffer address of the slice in a memory, and the tail slice identifier is used to indicate that the tail slice is the last slice of the data packet;

enqueuing corresponding slice information according to an order of the slices in the data packet, and in a process of enqueuing the corresponding slice information, if the slice is marked with the tail slice identifier, determining that the slice is the tail slice of the data packet, and generating a first-type node, where the first-type node points to a buffer address of slice information of the tail slice and the tail slice identifier of the tail slice; and determining whether a target queue is empty, and if the target queue is empty, writing the slice information of the tail slice into the target queue, and updating the head pointer of the queue head list according to the first-type node; or if the target queue is not empty, writing the slice information of the tail slice into the target queue, and adding the first-type node to a tail of a queue linked sublist corresponding to the target queue.

With reference to the first aspect, in a first possible implementation, the method further includes: in the process of enqueuing the corresponding slice information, if the slice is not marked with the tail slice identifier, determining that the slice is a non-tail slice of the data packet, and generating a second-type node, where the second-type node points to a buffer address of slice information of the non-tail slice, and the non-tail slice is another slice in the data packet other than the last slice; and determining whether the target queue is empty, and if the target queue is empty, writing the slice information of the non-tail slice into the target queue, and updating the head pointer of the queue head list according to the second-type node; or if the target queue is not empty, writing the slice information of the non-tail slice into the target queue, and adding the second-type node to the tail of the queue linked sublist corresponding to the target queue.

With reference to the first aspect or the first possible implementation of the first aspect, in a second possible implementation, the queue head list further includes queue indication information, and the determining whether a target queue is empty includes: reading queue indication information from a queue head list corresponding to the target queue, and determining, according to the queue indication information, whether the target queue is empty.

With reference to the second possible implementation of the first aspect, in a third possible implementation, the method further includes: if the target queue is empty, after the slice information of the tail slice is written into the target queue or the slice information of the non-tail slice is written into the target queue, updating the queue indication information.

With reference to the first aspect, in a fourth possible implementation, the method further includes: updating the tail pointer of the queue tail list according to the first-type node after the slice information of the tail slice is written into the target queue.

With reference to first possible implementation of the first aspect, in a fourth possible implementation, the method further includes: updating the tail pointer of the queue tail list according to the second-type node after the slice information of the non-tail slice is written into the target queue.

A second aspect of the present disclosure provides a data dequeuing method, applied to a queue management circuit in a queue management system of a communications processing chip, where several queues, a queue head list, a queue tail list, and a total queue linked list are established in the queue management system, the total queue linked list includes several queue linked sublists, each queue is corresponding to a queue head list, a queue tail list, and a queue linked sublist, the queue head list includes at least a head pointer, and the queue tail list includes at least a tail pointer; several communications ports are further disposed on the communications processing chip, and each communications port is corresponding to at least two queues; and the method may include: reading a head pointer of a queue head list of a target queue from several queues of a current communications port, where slice information of a slice is written in the queue, the slice is obtained by dividing a data packet, a tail slice of the data packet is marked with a tail slice identifier, and the slice information includes at least a port number, a priority, and a buffer address of the slice in a memory; and the head pointer points to a first-type node or a second-type node, the first-type node points to a buffer address of slice information of the tail slice and the tail slice identifier of the tail slice, the second-type node points to a buffer address of slice information of a non-tail slice of the data packet, the tail slice identifier is used to indicate that the tail slice is the last slice of the data packet, and the non-tail slice is another slice in the data packet other than the last slice; if it is determined that the head pointer points to the first-type node, reading the slice information of the tail slice from the target queue according to the buffer address, to which the first-type node points, of the slice information of the tail slice; and triggering queue priority switching of the current communications port after reading of the slice information of the tail slice is completed.

With reference to the second aspect, in a first possible implementation, the method further includes: if it is determined that the head pointer points to the second-type node, reading the slice information of the non-tail slice from the target queue according to the buffer address, to which the second-type node points, of the slice information of the non-tail slice, and triggering queue priority switching of the current communications port after reading of the slice information of the non-tail slice is completed.

With reference to the second aspect or the first possible implementation of the second aspect, in a second possible implementation, the method further includes: after reading of the slice information of the tail slice is completed or reading of the slice information of the non-tail slice is completed, reading a next node from a queue linked sublist corresponding to the target queue, and updating the head pointer of the queue head list according to the next node, where the next node is the first-type node or the second-type node.

With reference to the second aspect or the first possible implementation of the second aspect, in a third possible implementation, before the reading a head pointer of a queue head list of a target queue from several queues of a current communications port, the method includes: receiving a dequeuing notification message sent by a scheduler, where the dequeuing notification message includes a queue number, and a queue indicated by the queue number is the target queue.

With reference to the third possible implementation of the second aspect, in a fourth possible implementation, the triggering queue priority switching of the current communications port after reading of the slice information of the tail slice is completed or after reading of the slice information of the non-tail slice is completed includes: when a scheduling time of a communications port arrives, triggering the scheduler to schedule a corresponding communications port according to a configured timeslot, and reading latest dequeuing information of the corresponding communications port in previous dequeuing, where the latest dequeuing information includes at least a latest dequeued queue number, latest dequeued slice information, and a node used for dequeuing the latest dequeued slice information that are of the corresponding communications port in the previous dequeuing; and the scheduler determines, according to the latest dequeuing information, whether to trigger queue priority switching of the current communications port, and if no, the scheduler sends a dequeuing notification request to the queue management circuit, where a queue number included in the dequeuing notification request is the latest dequeued queue number, or if yes, the scheduler triggers queue priority switching of the current communications port.

With reference to the fourth possible implementation of the second aspect, in a fifth possible implementation, the triggering queue priority switching of the current communications port includes: triggering the scheduler to: determine a highest-priority queue from non-empty queues of the current communications port, switch the target queue to the highest-priority queue, and send the dequeuing notification message.

A third aspect of the present disclosure provides a queue management circuit, where the queue management circuit is disposed in a queue management system of a communications processing chip, several queues, a queue head list, a queue tail list, and a total queue linked list are established in the queue management system, the total queue linked list includes several queue linked sublists, each queue is corresponding to a queue head list, a queue tail list, and a queue linked sublist, the queue head list includes at least a head pointer, and the queue tail list includes at least a tail pointer; several communications ports are further disposed on the communications processing chip, and each communications port is corresponding to at least two queues; and the queue management circuit includes:

a receiver, configured to: receive a to-be-enqueued data packet, divide the data packet into several slices to obtain slice information of the slices, and mark a tail slice of the data packet with a tail slice identifier, where the slice information includes at least a port number, a priority, and a buffer address of the slice in a memory, and the tail slice identifier is used to indicate that the tail slice is the last slice of the data packet; and an enqueuing processing circuit, configured to: enqueue corresponding slice information according to an order of the slices in the data packet, and in a process of enqueuing the corresponding slice information, if the slice is marked with the tail slice identifier, determine that the slice is the tail slice of the data packet, and generate a first-type node, where the first-type node points to a buffer address of slice information of the tail slice and the tail slice identifier of the tail slice; and determine whether a target queue is empty, and if the target queue is empty, write the slice information of the tail slice into the target queue, and update the head pointer of the queue head list according to the first-type node; or if the target queue is not empty, write the slice information of the tail slice into the target queue, add the first-type node to a tail of a queue linked sublist corresponding to the target queue, and update the tail pointer of the queue tail list according to the first-type node.

With reference to the third aspect, in a first possible implementation, the enqueuing processing circuit is further configured to: in the process of enqueuing the corresponding slice information, if the slice is not marked with the tail slice identifier, determine that the slice is a non-tail slice of the data packet, and generate a second-type node, where the second-type node points to a buffer address of slice information of the non-tail slice, and the non-tail slice is another slice in the data packet other than the last slice; and determine whether the target queue is empty, and if the target queue is empty, write the slice information of the non-tail slice into the target queue, and update the head pointer of the queue head list according to the second-type node; or if the target queue is not empty, write the slice information of the non-tail slice into the target queue, add the second-type node to the tail of the queue linked sublist corresponding to the target queue, and update the tail pointer of the queue tail list according to the second-type node.

With reference to the third aspect or the first possible implementation of the third aspect, in a second possible implementation, the queue head list further includes queue indication information, and the enqueuing processing circuit is configured to: read queue indication information from a queue head list corresponding to the target queue, and determine, according to the queue indication information, whether the target queue is empty.

With reference to the second possible implementation of the third aspect, in a third possible implementation, the enqueuing processing circuit is further configured to: if the target queue is empty, after the slice information of the tail slice is written into the target queue or the slice information of the non-tail slice is written into the target queue, update the queue indication information, and send a dequeuing request message to a scheduler in the queue management system, where the dequeuing request message includes a queue number.

With reference to the third aspect, in a fourth possible implementation, the enqueuing processing circuit is further configured to update the tail pointer of the queue tail list according to the first-type node after the slice information of the tail slice is written into the target queue.

With reference to first possible implementation of the third aspect, in a fifth possible implementation, the enqueuing processing circuit is further configured to update the tail pointer of the queue tail list according to the second-type node after the slice information of the non-tail slice is written into the target queue.

A fourth aspect of the present disclosure provides a queue management circuit, where the queue management circuit is disposed in a queue management system of a communications processing chip, several queues, a queue head list, a queue tail list, and a total queue linked list are established in the queue management system, the total queue linked list includes several queue linked sublists, each queue is corresponding to a queue head list, a queue tail list, and a queue linked sublist, the queue head list includes at least a head pointer, and the queue tail list includes at least a tail pointer; several communications ports are further disposed on the communications processing chip, and each communications port is corresponding to at least two queues; and the queue management circuit includes:

a reading chip, configured to read a head pointer of a queue head list of a target queue from several queues of a current communications port, where slice information of a slice is written in the queue, the slice is obtained by dividing a data packet, a tail slice of the data packet is marked with a tail slice identifier, and the slice information includes at least a port number, a priority, and a buffer address of the slice in a memory; and the head pointer points to a first-type node or a second-type node, the first-type node points to a buffer address of slice information of the tail slice and the tail slice identifier of the tail slice, the second-type node points to a buffer address of slice information of a non-tail slice of the data packet, the tail slice identifier is used to indicate that the tail slice is the last slice of the data packet, and the non-tail slice is another slice in the data packet other than the last slice; and a dequeuing processing circuit, configured to: if it is determined that the head pointer points to the first-type node, read the slice information of the tail slice from the target queue according to the buffer address, to which the first-type node points, of the slice information of the tail slice, and trigger queue priority switching of the current communications port after reading of the slice information of the tail slice is completed.

With reference to the fourth aspect, in a first possible implementation, the dequeuing processing circuit is further configured to: if it is determined that the head pointer points to the second-type node, read the slice information of the non-tail slice from the target queue according to the buffer address, to which the second-type node points, of the slice information of the non-tail slice, and trigger queue priority switching of the current communications port after reading of the slice information of the non-tail slice is completed.

With reference to the fourth aspect or the first possible implementation of the fourth aspect, in a second possible implementation, the dequeuing processing circuit is further configured to: after reading of the slice information of the tail slice is completed or reading of the slice information of the non-tail slice is completed, read a next node from a queue linked sublist corresponding to the target queue, and update the head pointer of the queue head list according to the next node, where the next node is the first-type node or the second-type node.

With reference to the fourth aspect or the first possible implementation of the fourth aspect, in a third possible implementation, the dequeuing processing circuit is further configured to: before the head pointer of the queue head list of the target queue is read from the several queues of the current communications port, receive a dequeuing notification message sent by a scheduler, where the dequeuing notification message includes a queue number, and a queue indicated by the queue number is the target queue.

With reference to the third possible implementation of the fourth aspect, in a fourth possible implementation, the dequeuing processing circuit is configured to: when a scheduling time of a communications port arrives, trigger the scheduler to schedule a corresponding communications port according to a configured timeslot, and read latest dequeuing information of the corresponding communications port in previous dequeuing, where the latest dequeuing information includes at least a latest dequeued queue number, latest dequeued slice information, and a node used for dequeuing the latest dequeued slice information that are of the corresponding communications port in the previous dequeuing; and the scheduler determines, according to the latest dequeuing information, whether to trigger queue priority switching of the current communications port, and if no, the scheduler sends a dequeuing notification request to the queue management circuit, where a queue number included in the dequeuing notification request is the latest dequeued queue number, or if yes, the scheduler triggers queue priority switching of the current communications port.

With reference to the fourth possible implementation of the fourth aspect, in a fifth possible implementation, the dequeuing processing circuit is configured to trigger the scheduler to: determine a highest-priority queue from non-empty queues of the current communications port, switch the target queue to the highest-priority queue, and send the dequeuing notification message.

It can be learned from the foregoing technical solutions that, in the data enqueuing method and the data dequeuing method provided in the embodiments of the present disclosure, to enqueue slice information of a slice, if the slice is a tail slice of a data packet, a first-type node is generated, where the first-type node points to a buffer address of slice information of the tail slice and a tail slice identifier of the tail slice, and the tail slice identifier is used to indicate that the tail slice is the last slice of the data packet. After the first-type node is generated, if a target queue is empty, the slice information of the tail slice is written into the target queue, and a head pointer of a queue head list is updated according to the first-type node, so that the head pointer points to the buffer address of the slice information of the tail slice and the tail slice identifier of the tail slice. When the target queue is not empty, the slice information of the tail slice is written into the target queue, and the first-type node is added into a queue linked sublist. In this case, to dequeue the slice information, when the slice information is being dequeued according to the head pointer, if the head pointer points to the first-type node, it can be learned in advance, according to the tail slice identifier to which the first-type node points, that a to-be-dequeued slice is the tail slice of the data packet, and queue priority switching is performed within a same port after dequeuing of the slice information of the tail slice is completed. In this way, on the basis of entire-packet dequeuing, slice dequeuing and slice transmission can be implemented within a same communications port according to a priority.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
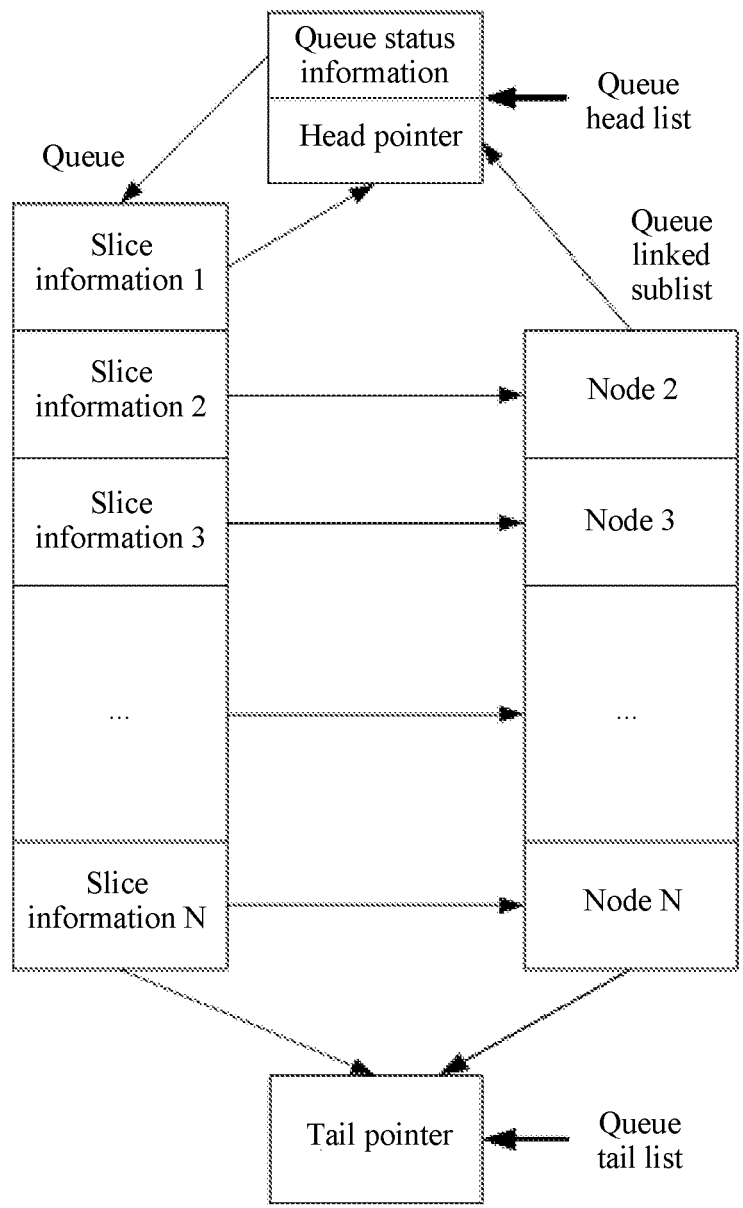
FIG. 1 is a schematic application diagram of queue management according to some embodiments of the present disclosure.

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Embodiments of the present disclosure provide a data enqueuing method and a data dequeuing method, so as to implement, on the basis of entire-packet dequeuing, slice dequeuing and slice transmission within a same communications port according to a priority. The embodiments of the present disclosure further provide a queue management circuit corresponding to data enqueuing and a queue management circuit corresponding to data dequeuing.

First, a communications processing chip is briefly described. The communications processing chip is responsible for performing sending preprocessing on a to-be-sent data packet and forwarding the to-be-sent data packet. Several MAC ports are generally disposed on the communications processing chip, and each MAC port is responsible for forwarding a data packet of a corresponding service type. The several MAC ports are scheduled by using a particular scheduling policy. The embodiments of the present disclosure provide a scheduling policy. In this scheduling policy, a scheduling timeslot is configured for a MAC port, a corresponding MAC port is scheduled in a corresponding scheduling timeslot, and only one MAC port is scheduled in each scheduling timeslot. MAC ports may be corresponding to different bandwidths. However, limited by a total system bandwidth, a sum of bandwidths of all MAC ports is required to be not greater than the total system bandwidth. For example, if the total system bandwidth is 320 G/bps, and 28 MAC ports, of which each MAC port's bandwidth is 10 G/bps, are disposed on the communications processing chip, a total sum of bandwidths of the 28 MAC ports is 280 G/bps, and is less than the total system bandwidth 320 G/bps.

Because a bandwidth of a MAC port is limited, if the communications processing chip continuously sends data packets whose data amounts are greater than the bandwidth of the MAC port to the MAC port in a time period, sends no data packet to the MAC port in a next time period, and further sends some data packets to the MAC port in another time period, a transmission speed of the MAC port is slow due to such instable transmission and large data packets. This tends to cause congestion, thereby causing a data burst. Therefore, in the embodiments of the present disclosure, a to-be-enqueued data packet needs to be first divided into several slices. Specifically, slice division may be performed according to a minimum bandwidth of a MAC port, and then the slices are sent to the MAC port, so as to reduce a data burst.

Further, slice based entire-packet dequeuing is to be implemented in the embodiments of the present disclosure, that is, within a same port, another data packet is sent after sending of one data packet is completed. In addition, one MAC port may be responsible for forwarding data packets of different service types, and the data packets of different service types have different forwarding priorities. Therefore, the MAC port is limited by a priority. A priority scheduling policy provided in the prior art is implemented based on a data packet, that is, the priority scheduling policy is invoked to perform queue priority scheduling after dequeuing of a data packet is completed. However, in the embodiments of the present disclosure, because a data packet is divided into slices, it is inconsistent with an entire-packet dequeuing policy if a priority scheduling policy is scheduled to perform queue priority scheduling each time when a slice is dequeued. In the prior art, no priority scheduling policy is applicable to slice based dequeuing.

Therefore, the embodiments of the present disclosure provide a data enqueuing method and a data dequeuing method, so as to implement, based on a prerequisite of slice enqueuing and entire-packet dequeuing, slice dequeuing and slice transmission within a same port according to a priority.

The data enqueuing method and the data dequeuing method provided in the embodiments of the present disclosure are applied to a queue management system of a communications processing chip, and the queue management system includes a queue management circuit and a scheduler. The communications processing chip receives a to-be-enqueued data packet, and the data packet is from a network or a terminal connected to the communications processing chip. The data packet is sent to the queue management circuit, and the queue management circuit divides the data packet into several slices. A tail slice of the data packet is marked with a tail slice identifier, to indicate that the slice is the last slice of the data packet, and another slice other than the last slice is a non-tail slice of the data packet. Storage space is allocated to each slice in the communications processing chip to obtain a buffer address of the slice in a memory. Then, slice information of the slice is obtained according to the buffer address of the slice in the memory, a port number of a MAC port corresponding to the slice, a priority of the slice, and the like, and the slice information is written into a corresponding queue. In the embodiments of the present disclosure, slice enqueuing and slice dequeuing are mainly implemented by managing slice information.

First, a queue, a queue head list, a queue tail list, and a total queue linked list are established in the communications processing chip according to different service types. One queue is corresponding to one queue head list and one queue tail list. The total queue linked list includes several queue linked sublists, and each queue linked sublist is corresponding to one queue. The queue head list may be implemented by using a register group, and a two-read and two-write operation may be implemented in one period. The queue tail list may be implemented by using a dual-port RAM. The queue linked sublist may also be implemented by using a dual-port RAM.

Slice information of a slice is written into the queue.

The queue head list includes queue status information and a head pointer, and the head pointer is updated according to a first-type node or a second-type node. The first-type node points to a buffer address of slice information of a tail slice and a tail slice identifier of the tail slice, and the second-type node points to a buffer address of slice information of a non-tail slice. The tail slice identifier is used to indicate that the tail slice is the last slice of a data packet, and the queue status information is used to indicate that a queue is empty or not empty.

The queue tail list includes a tail pointer, and the tail pointer is also updated according to the first-type node or the second-type node.

A node is written into the queue linked sublist, and buffer addresses of all slice information in a queue are linked by using nodes. The node includes the first-type node and/or the second-type node. Each piece of slice information in a corresponding queue other than the first piece of slice information is in a one-to-one correspondence with a node in the queue linked sublist according to an order. For example, the corresponding queue includes slice information A, slice information B, and slice information C. The slice information A is corresponding to a node 1, the slice information B is corresponding to a node 2, and the slice information C is corresponding to a node 3. The head pointer of the queue head list is updated according to the node 1, and the tail pointer of the queue tail list is updated according to the node 3. The node 2 and the node 3 are in the queue linked sublist, and the node 2 and the node 3 are linked. When the corresponding queue includes only one piece of slice information and there is no node in the queue linked sublist, the head pointer of the queue head list points to a node corresponding to the slice information, and the tail pointer of the queue tail list points to the node corresponding to the slice information. When the corresponding queue includes only two pieces of slice information and there is only a node corresponding to the second piece of slice information in the queue linked sublist, the head pointer of the queue head list points to a node corresponding to the first piece of slice information, and the tail pointer of the queue tail list points to the node corresponding to the second piece of slice information.

Specifically, as shown in FIG. 1, N pieces of slice information are written into a queue, and a queue linked sublist includes N−1 nodes. Slice information 2 is corresponding to a node 2, slice information 3 is corresponding to a node 3, and by analogy, slice information N is corresponding to a node N. A head pointer of a queue head list points to a node 1 corresponding to slice information 1, and a tail pointer points to the node N.

After dividing the data packet into the slices, the queue management circuit enqueues slice information of the slices according to an order of the slices in the data packet. When slice information is being enqueued, if a slice is marked with a tail slice identifier, it indicates that the slice is a tail slice of the data packet. If the queue status information in the queue head list indicates that a queue is empty, in addition to writing slice information of the slice, a first-type node is generated. The first-type node points to a buffer address of slice information of the tail slice and the tail slice identifier of the tail slice. The head pointer of the queue head list and the tail pointer of the queue tail list are updated according to the first-type node, so that the head pointer points to the buffer address of the slice information of the tail slice and the tail slice identifier of the tail slice, and the tail pointer points to the buffer address of the slice information of the tail slice and the tail slice identifier of the tail slice. If the queue status information indicates that a queue is not empty, in addition to writing slice information of the tail slice into the queue, a first-type node is added to a tail of a corresponding queue linked sublist, and the tail pointer of the queue tail list is updated according to the first-type node. If a slice is not marked with a tail slice identifier, it indicates that the slice is a non-tail slice of the data packet. If the queue status information in the queue head list indicates that a queue is empty, slice information of the non-tail slice in written into the queue, and a second-type node is generated. The second-type node points to a buffer address of the slice information of the non-tail slice, and then the head pointer of the queue head list and the tail pointer of the queue tail list are updated according to the second-type node. If the queue status information indicates that a queue is not empty, slice information of the non-tail slice is written into the queue, a generated second-type node is added into a queue linked sublist, and the tail pointer of the queue tail list is updated according to the generated second-type node.

When slice information of a slice is being dequeued, the queue management circuit reads the head pointer of the queue head list. If the head pointer indicates that there is a tail slice identifier, it indicates that the to-be-dequeued slice is the tail slice of the data packet. After dequeuing of the tail slice is completed, dequeuing of the entire data packet is completed, and priority switching may be performed within a MAC port. Therefore, after the slice information is read from the queue according to a buffer address to which the head pointer points, priority switching processing is triggered within the MAC port. If the head pointer indicates that there is no tail slice identifier, the slice information is read from the queue according to a buffer address to which the head pointer points. Because the head pointer indicates that there is no tail slice identifier, it indicates that the to-be-dequeued slice is a non-tail slice of the data packet. After dequeuing of the non-tail slice is completed, priority switching does not need to be performed within the MAC port.

In addition, it should be noted that no matter whether the head pointer indicates that there is a tail slice identifier or there is no tail slice identifier, after dequeuing of the slice information of the tail slice or the slice information of the non-tail slice is completed, a next node is read from a corresponding queue linked sublist. If the next node is the first-type node, the head pointer is updated according to the first-type node; or if the next node is the second-type node, the head pointer is updated according to the second-type node.

With reference to the foregoing description, an embodiment of the present disclosure provides a data enqueuing method, applied to a queue management circuit in a queue management system of a communications processing chip, where several queues, a queue head list, a queue tail list, and a total queue linked list are established in the queue management system, the total queue linked list includes several queue linked sublists, each queue is corresponding to a queue head list, a queue tail list, and a queue linked sublist, the queue head list includes at least a head pointer, and the queue tail list includes at least a tail pointer; several communications ports are further disposed on the communications processing chip, and each communications port is corresponding to at least two queues; and the method includes: receiving a to-be-enqueued data packet, dividing the data packet into several slices to obtain slice information of the slices, and marking a tail slice of the data packet with a tail slice identifier, where the slice information includes at least a port number, a priority, and a buffer address of the slice in a memory, and the tail slice identifier is used to indicate that the tail slice is the last slice of the data packet; enqueuing corresponding slice information according to an order of the slices in the data packet, and in a process of enqueuing the corresponding slice information, if the slice is marked with the tail slice identifier, determining that the slice is the tail slice of the data packet, and generating a first-type node, where the first-type node points to a buffer address of slice information of the tail slice and the tail slice identifier of the tail slice; and determining whether a target queue is empty, and if the target queue is empty, writing the slice information of the tail slice into the target queue, and updating the head pointer of the queue head list according to the first-type node; or if the target queue is not empty, writing the slice information of the tail slice into the target queue, and adding the first-type node to a tail of a queue linked sublist corresponding to the target queue.

In addition, an embodiment of the present disclosure further provides a data dequeuing method, applied to a queue management circuit in a queue management system of a communications processing chip, where several queues, a queue head list, a queue tail list, and a total queue linked list are established in the queue management system, the total queue linked list includes several queue linked sublists, each queue is corresponding to a queue head list, a queue tail list, and a queue linked sublist, the queue head list includes at least a head pointer, and the queue tail list includes at least a tail pointer; several communications ports are further disposed on the communications processing chip, and each communications port is corresponding to at least two queues; and the method may include: reading a head pointer of a queue head list of a target queue from several queues of a current communications port, where slice information of a slice is written in the queue, the slice is obtained by dividing a data packet, a tail slice of the data packet is marked with a tail slice identifier, and the slice information includes at least a port number, a priority, and a buffer address of the slice in a memory; and the head pointer points to a first-type node or a second-type node, the first-type node points to a buffer address of slice information of the tail slice and the tail slice identifier of the tail slice, the second-type node points to a buffer address of slice information of a non-tail slice of the data packet, the tail slice identifier is used to indicate that the tail slice is the last slice of the data packet, and the non-tail slice is another slice in the data packet other than the last slice; if it is determined that the head pointer points to the first-type node, reading the slice information of the tail slice from the target queue according to the buffer address, to which the first-type node points, of the slice information of the tail slice; and triggering queue priority switching of the current communications port after reading of the slice information of the tail slice is completed.

It can be learned that, to enqueue slice information of a slice, if the slice is a tail slice of a data packet, a first-type node is generated, where the first-type node points to a buffer address of slice information of the tail slice and a tail slice identifier of the tail slice, and the tail slice identifier is used to indicate that the tail slice is the last slice of the data packet. After the first-type node is generated, if a target queue is empty, the slice information of the tail slice is written into the target queue, and a head pointer of a queue head list is updated according to the first-type node, so that the head pointer points to the buffer address of the slice information of the tail slice and the tail slice identifier of the tail slice. When the target queue is not empty, the slice information of the tail slice is written into the target queue, and the first-type node is added into a queue linked sublist. In this case, to dequeue the slice information, when the slice information is being dequeued according to the head pointer, if the head pointer points to the first-type node, it can be learned in advance, according to the tail slice identifier to which the first-type node points, that a to-be-dequeued slice is the tail slice of the data packet, and queue priority switching is performed within a same port after dequeuing of the slice information of the tail slice is completed. In this way, on the basis of entire-packet dequeuing, slice dequeuing and slice transmission can be implemented within a same communications port according to a priority.

Figure 2:
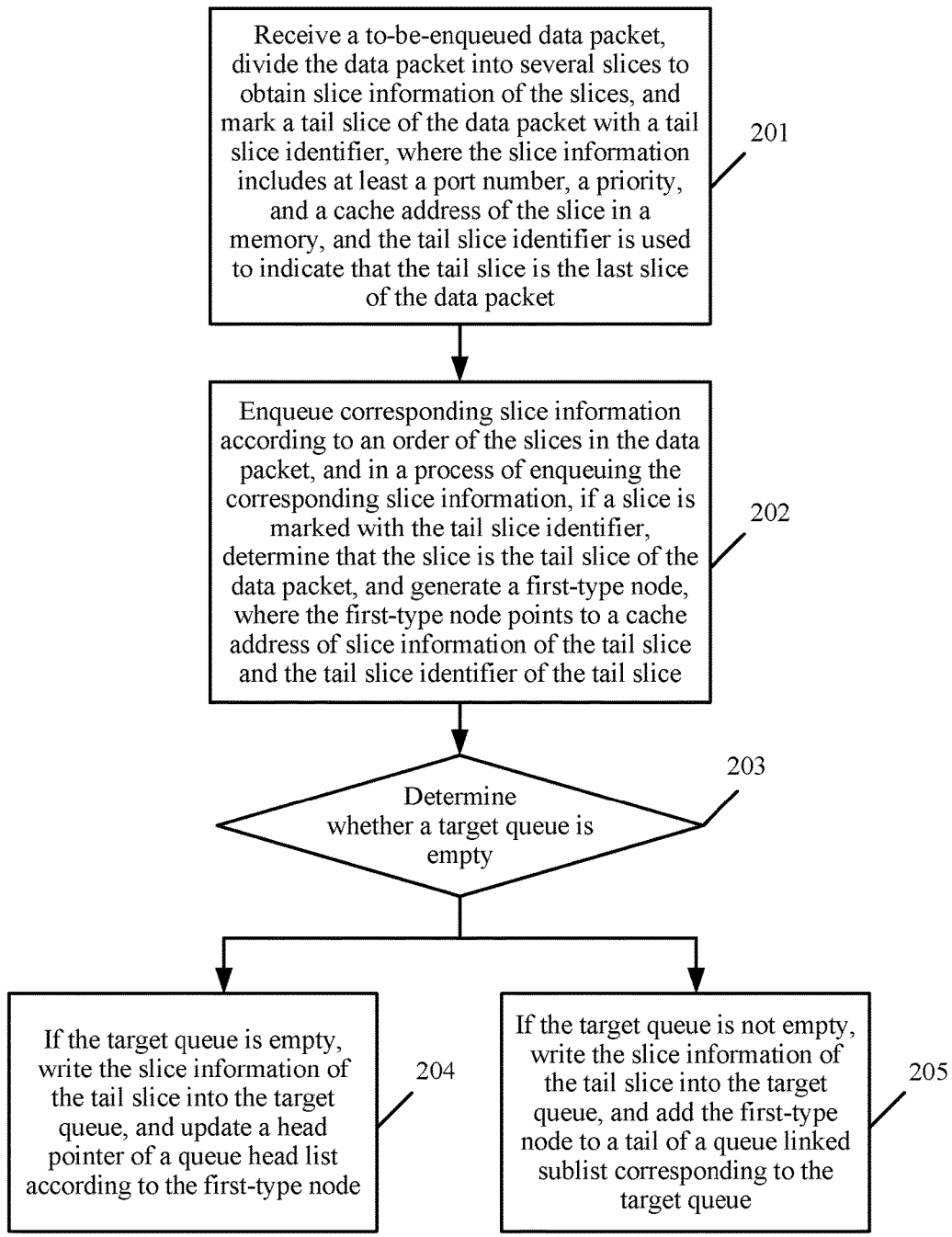
FIG. 2 is a schematic flowchart of a data enqueuing method according to some embodiments of the present disclosure.

Referring to FIG. 2, FIG. 2 is a schematic flowchart of a data enqueuing method according to some embodiments of the present disclosure. As shown in FIG. 2, the data enqueuing method may include the following steps.

201. Receive a to-be-enqueued data packet, divide the data packet into several slices to obtain slice information of the slices, and mark a tail slice of the data packet with a tail slice identifier, where the slice information includes at least a port number, a priority, and a buffer address of the slice in a memory, and the tail slice identifier is used to indicate that the tail slice is the last slice of the data packet.

The data packet is from a network or a terminal connected to the communications processing chip.

The port number is used to indicate a communications port corresponding to a queue in which the data packet is located. The communications port in this embodiment of the present disclosure may be the MAC port described above. The priority is a dequeuing priority of the queue, in which the data packet is located, in the communications port.

202. Enqueue corresponding slice information according to an order of the slices in the data packet, and in a process of enqueuing the corresponding slice information, if the slice is marked with the tail slice identifier, determine that the slice is the tail slice of the data packet, and generate a first-type node, where the first-type node points to a buffer address of slice information of the tail slice and the tail slice identifier of the tail slice.

203. Determine whether a target queue is empty.

A queue head list corresponding to a queue further includes queue indication information, and the queue indication information is used to indicate that the queue is in an empty state or a non-empty state. That the queue is empty means that no slice information is written into the queue. In this case, step 203 specifically includes: reading queue indication information from a queue head list corresponding to the target queue, and determining, according to the queue indication information, whether the target queue is empty.

When the slice is the tail slice of the data packet, the first-type node is generated. After the first-type node is generated, if the target queue is empty, step 204 is performed; or if the target queue is not empty, step 205 is performed.

204. If the target queue is empty, write the slice information of the tail slice into the target queue, and update a head pointer of the queue head list according to the first-type node.

In some embodiments of the present disclosure, after the slice information of the tail slice is written into the target queue, a tail pointer of a queue tail list is further updated according to the first-type node, and the tail pointer indicates the last piece of slice information in the queue.

205. If the target queue is not empty, write the slice information of the tail slice into the target queue, and add the first-type node to a tail of a queue linked sublist corresponding to the target queue.

In some embodiments of the present disclosure, after the slice information of the non-tail slice is written into the target queue, the tail pointer of the queue tail list is updated according to the second-type node.

In some embodiments of the present disclosure, in the process of enqueuing the corresponding slice information, if the slice is not marked with the tail slice identifier, it is determined that the slice is a non-tail slice of the data packet, and a second-type node is generated, where the second-type node points to a buffer address of slice information of the non-tail slice, and the non-tail slice is another slice in the data packet other than the last slice; and it is determined whether the target queue is empty, and if the target queue is empty, the slice information of the non-tail slice is written into the target queue, and the head pointer of the queue head list is updated according to the second-type node; or if the target queue is not empty, the slice information of the non-tail slice is written into the target queue, the second-type node is added to the tail of the queue linked sublist corresponding to the target queue, and the tail pointer of the queue tail list is updated according to the second-type node.

It can be understood that, in this embodiment of the present disclosure, if the queue is empty, after the slice information of the tail slice or the slice information of the non-tail slice is written into the queue, the queue is switched from an empty state to a non-empty state. Therefore, if the queue is empty, after the slice information of the tail slice or the slice information of the non-tail slice is written into the queue, the queue indication information needs to be updated, so that the queue indication information indicates that the queue is not empty.

Therefore, in some embodiments of the present disclosure, if the target queue is empty, after the slice information of the tail slice is written into the target queue or the slice information of the non-tail slice is written into the target queue, the queue indication information is updated.

Figure 3:
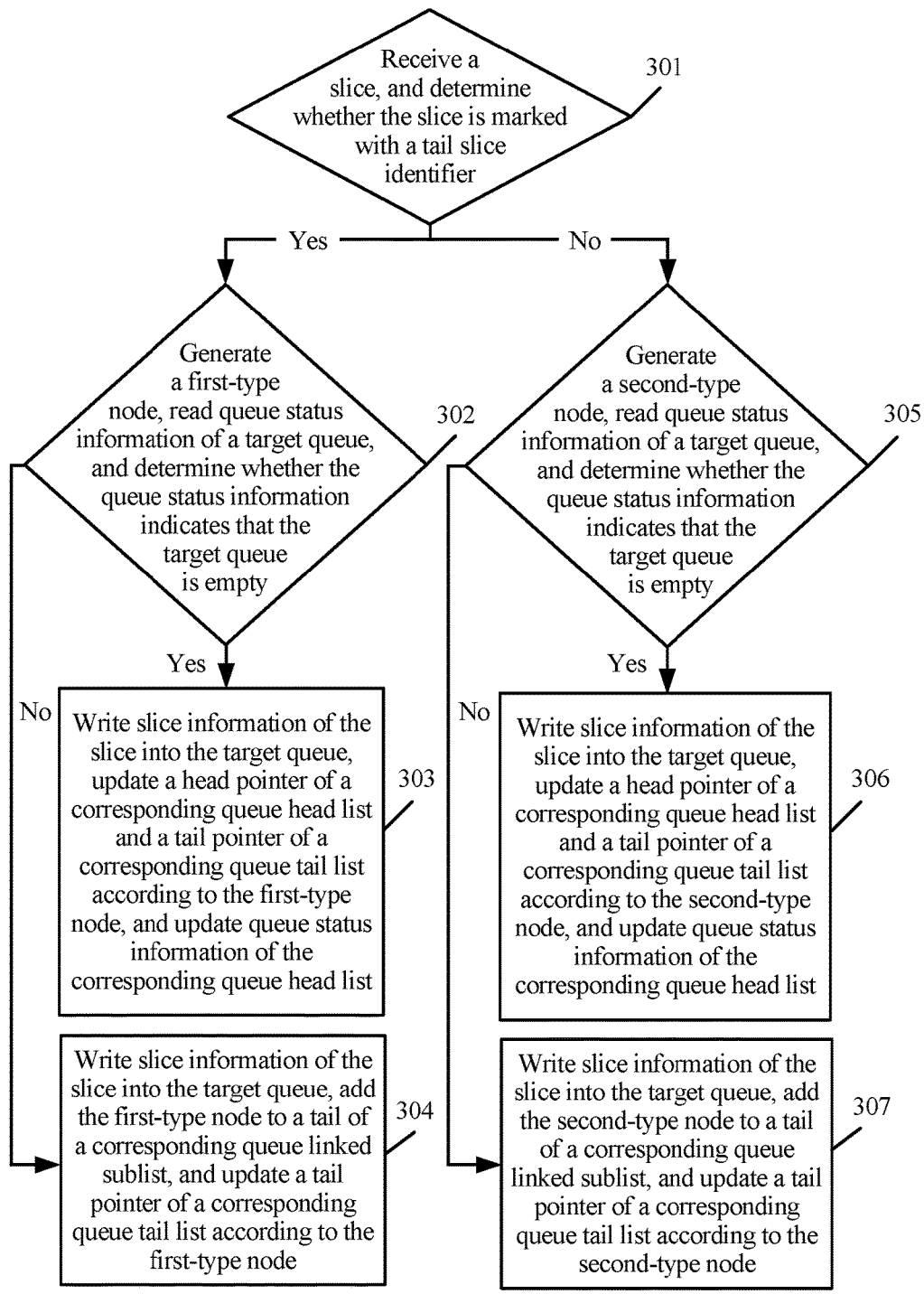
FIG. 3 is a schematic flowchart of a data dequeuing method according to some embodiments of the present disclosure.

Referring to FIG. 3, FIG. 3 is a schematic flowchart of a data enqueuing method according to some embodiments of the present disclosure. As shown in FIG. 3, the data enqueuing method may include the following steps.

301. Receive a slice, and determine whether the slice is marked with a tail slice identifier.

If yes, the slice is determined as a tail slice of a data packet, and step 302 is performed; or if no, the slice is determined as a non-tail slice of a data packet, and step 305 is performed.

302. Generate a first-type node, read queue status information of a target queue, and determine whether the queue status information indicates that the target queue is empty.

If the queue status information of the target queue indicates that the target queue is empty, step 303 is performed; or if the queue status information of the target queue indicates that the target queue is not empty, step 304 is performed.

303. Write slice information of the slice into the target queue, update a head pointer of a corresponding queue head list and a tail pointer of a corresponding queue tail list according to the first-type node, and update queue status information of the corresponding queue head list.

304. Write slice information of the slice into the target queue, add the first-type node to a tail of a corresponding queue linked sublist, and update a tail pointer of a corresponding queue tail list according to the first-type node.

305. Generate a second-type node, read queue status information of a target queue, and determine whether the queue status information indicates that the target queue is empty.

If the queue status information of the target queue indicates that the target queue is empty, step 306 is performed; or if the queue status information of the target queue indicates that the target queue is not empty, step 307 is performed.

306. Write slice information of the slice into the target queue, update a head pointer of a corresponding queue head list and a tail pointer of a corresponding queue tail list according to the second-type node, and update queue status information of the corresponding queue head list.

307. Write slice information of the slice into the target queue, add the second-type node to a tail of a corresponding queue linked sublist, and update a tail pointer of a corresponding queue tail list according to the second-type node.

It can be learned that in the data enqueuing method provided in this embodiment of the present disclosure, when a slice is being enqueued, two main cases are as follows:

Case 1: If a slice is a tail slice of a data packet, a first-type node is generated, and then enqueuing processing is performed according to the following two cases:

A1. If a target queue is empty, slice information of the tail slice is written into the target queue, a head pointer of a queue head list and a tail pointer of a queue tail list are updated according to the first-type node, and queue status information of the queue head list is updated.

A2. If a target queue is not empty, slice information of the tail slice is written into the target queue, the first-type node is added into a queue linked sublist, and a tail pointer of a queue tail list is updated according to the first-type node.

Case 2: If a slice is a non-tail slice of a data packet, a second-type node is generated, and then enqueuing processing is performed according to the following two cases:

B1. If a target queue is empty, slice information of the non-tail slice is written into the target queue, a head pointer of a queue head list and a tail pointer of a queue tail list are updated according to the second-type node, and queue status information of the queue head list is updated.

B2. If a target queue is not empty, slice information of the non-tail slice is written into the target queue, the second-type node is added into a queue linked sublist, and a tail pointer of a queue tail list is updated according to the second-type node.

It can be learned that after slice enqueuing is performed in the foregoing manner, when slice dequeuing is being performed, a queue management circuit may determine in advance, according to a head pointer of a queue head list, whether a to-be-dequeued slice is a tail slice of a data packet, so as to determine in advance whether priority switching needs to be performed within a communications port.

The technical solutions of the present disclosure are described in detail above on the basis of slice enqueuing, and the technical solutions of the present disclosure are further described in detail below on the basis of slice dequeuing.

Figure 4:
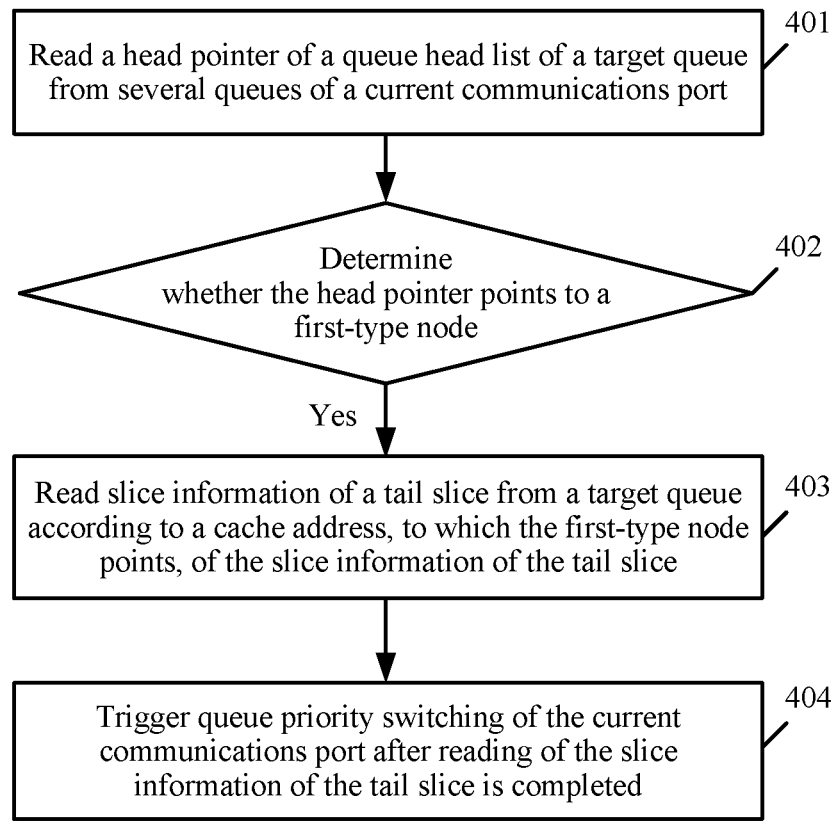
FIG. 4 is a schematic flowchart of a data dequeuing method according to some embodiments of the present disclosure.

Referring to FIG. 4, FIG. 4 is a schematic flowchart of a data dequeuing method according to some embodiments of the present disclosure. As shown in FIG. 4, the data dequeuing method may include the following steps.

401. Read a head pointer of a queue head list of a target queue from several queues of a current communications port.

Slice information of a slice is written in the queue, the slice is obtained by dividing a data packet, a tail slice of the data packet is marked with a tail slice identifier, and the slice information includes at least a port number, a priority, and a buffer address of the slice in a memory. The head pointer points to a first-type node or a second-type node, the first-type node points to a buffer address of slice information of the tail slice and the tail slice identifier of the tail slice, the second-type node points to a buffer address of slice information of a non-tail slice of the data packet, the tail slice identifier is used to indicate that the tail slice is the last slice of the data packet, and the non-tail slice is another slice in the data packet other than the last slice.

This embodiment of the present disclosure is based on slice dequeuing implemented within a communications port according to a priority, and the communications port may be specifically the MAC port described above.

402. Determine whether the head pointer points to a first-type node.

It can be understood that the head pointer in this embodiment of the present disclosure points to the first-type node or the second-type node.

If yes, step 403 is performed.

403. Read slice information of a tail slice from a target queue according to a buffer address, to which the first-type node points, of the slice information of the tail slice.

If the head pointer points to the first-type node, dequeuing of the tail slice is completed according to the buffer address, to which the first-type node points, of the slice information of the tail slice.

404. Trigger queue priority switching of the current communications port after reading of the slice information of the tail slice is completed.

Optionally, priorities of different queues within a same MAC port are scheduled and switched by using a strict priority (SP) scheduling algorithm or a round robin (RR) scheduling algorithm.

It can be learned that, when dequeuing is performed according to the head pointer of the queue head list, it can be determined in advance, according to the head pointer, whether priority switching needs to be performed within the communications port. Specifically, when the head pointer points to the first-type node, because the first-type node points to the tail slice identifier, it can be learned that a to-be-dequeued slice is the tail slice of the data packet, and after dequeuing of the tail slice is completed, priority switching is performed within the communications port.

In some embodiments of the present disclosure, if it is determined that the head pointer points to the second-type node, the slice information of the non-tail slice is read from the target queue according to the buffer address, to which the second-type node points, of the slice information of the non-tail slice, and queue priority switching of the current communications port is triggered after reading of the slice information of the non-tail slice is completed.

Further, after reading of the slice information of the tail slice is completed or reading of the slice information of the non-tail slice is completed, a next node is read from a queue linked sublist corresponding to the target queue, and the head pointer of the queue head list is updated according to the next node, where the next node is the first-type node or the second-type node.

It can be learned that, after each time slice dequeuing is performed according to the head pointer, the next node is read from the queue linked sublist, and the head pointer is updated according to the next node. The next node is the first-type node or the second-type node, and the first-type node points to the buffer address of the slice information of the tail slice and the tail slice identifier of the tail slice. Therefore, during each time of dequeuing, the first-type node is removed from the queue linked sublist in dequeuing to update the head pointer. In this way, it can be ensured that during dequeuing, whether priority switching needs to be performed within the communications port can be determined in advance according to the head pointer, thereby ensuring that on the basis of entire-packet dequeuing, dequeuing is implemented within a same communications port according to a priority.

In some implementable manners of the present disclosure, the triggering queue priority switching of the current communications port in step 404 includes: triggering a scheduler to: determine a highest-priority queue from non-empty queues of the current communications port, switch the target queue to the highest-priority queue, and send a dequeuing notification message, where the enqueuing notification message includes a queue number.

It can be understood that, N queues can be scheduled for a same communications port, and N is a natural number greater than or equal to 1. Because priorities of the N queues are different, queue priority switching needs to be performed each time after dequeuing of one data packet is completed. In this embodiment of the present disclosure, the scheduler may complete priority switching of N queues within a same communications port. Certainly, a queue management circuit may alternatively complete priority switching. That the scheduler completes priority switching within a same communications port is described in detail in this embodiment of the present disclosure.

It should be noted that, some queues in the N queues may be empty queues, that is, no slice information is written into the queues. Therefore, in this embodiment of the present disclosure, priority determining is not performed for an empty queue, that is, the scheduler determines the highest-priority queue from the non-empty queues of the communications port, and notifies the queue management circuit, performs switching to the highest-priority queue, so as to perform slice dequeuing.

After determining the highest-priority queue, the scheduler sends the dequeuing notification message to the queue management circuit. The queue number included in the dequeuing notification message is a queue number of the highest-priority queue. The queue management circuit sequentially performs steps 401 to 404 after receiving the dequeuing notification message.

Therefore, in some embodiments of the present disclosure, before the reading a head pointer of a queue head list of a target queue from several queues of a current communications port, the method includes: receiving a dequeuing notification message sent by a scheduler, where the dequeuing notification message includes a queue number, and a queue indicated by the queue number is the target queue.

In some embodiments of the present disclosure, step 404 includes: when a scheduling time of a communications port arrives, triggering the scheduler to schedule a corresponding communications port according to a configured timeslot, and reading latest dequeuing information of the corresponding communications port in previous dequeuing, where the latest dequeuing information includes at least a latest dequeued queue number, latest dequeued slice information, and a node used for dequeuing the latest dequeued slice information that are of the corresponding communications port in the previous dequeuing; and the scheduler determines, according to the latest dequeuing information, whether to trigger queue priority switching of the current communications port, and if no, the scheduler sends a dequeuing notification request to the queue management circuit, where a queue number included in the dequeuing notification request is the latest dequeued queue number, or if yes, the scheduler triggers queue priority switching of the current communications port.

For example, there are a MAC port 1 and a MAC port 2, and a same MAC port is re-scheduled at a minimum interval of one period. In an example of periods A, B, and C, the MAC port 1 is scheduled in the period A, the MAC port 2 is scheduled in the period B, and the MAC port 1 is re-scheduled in the period C. In this embodiment of the present disclosure, it is determined, according to a queue head list, whether there is a tail slice identifier, so as to determine a tail slice. Therefore, in the period A, the queue management circuit reads slice information from a queue according to the queue head list to complete slice dequeuing. In the period B, the queue management circuit not only completes slice dequeuing in the MAC port 2 but also completes sending of a slice dequeued in the MAC port 1 in the period A, and further stores, in a register, slice information of a latest slice dequeued in the period A and information about the latest dequeued slice in the queue head list. In this case, in the period C, the queue management circuit may read the information from the register. If the information includes a tail slice identifier, the scheduler selects, according to completed queue switching of the MAC port 1, a highest-priority queue from non-empty queues of the MAC port 1 as a target queue, and notifies the queue management circuit.

Figure 5:
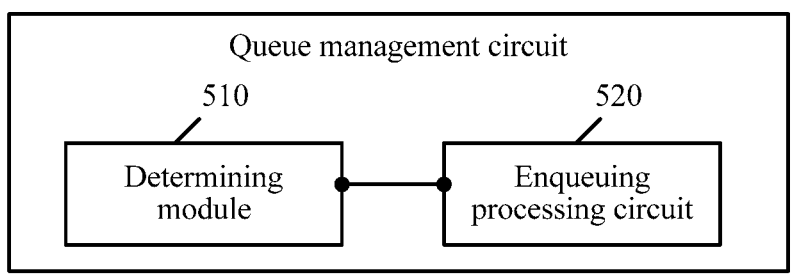
FIG. 5 is a schematic structural diagram of a queue management circuit according to some embodiments of the present disclosure.

FIG. 5 is a schematic structural diagram of a queue management circuit according to an embodiment of the present disclosure. As shown in FIG. 5, the queue management circuit may include: a determining module 510 and an enqueuing processing circuit 520.

The determining module 510 is configured to: receive a to-be-enqueued data packet, divide the data packet into several slices to obtain slice information of the slices, and mark a tail slice of the data packet with a tail slice identifier, where the slice information includes at least a port number, a priority, and a buffer address of the slice in a memory, and the tail slice identifier is used to indicate that the tail slice is the last slice of the data packet.

The enqueuing processing circuit 520 is configured to: enqueue corresponding slice information according to an order of the slices in the data packet, and in a process of enqueuing the corresponding slice information, if the slice is marked with the tail slice identifier, determine that the slice is the tail slice of the data packet, and generate a first-type node, where the first-type node points to a buffer address of slice information of the tail slice and the tail slice identifier of the tail slice; and determine whether a target queue is empty, and if the target queue is empty, write the slice information of the tail slice into the target queue, and update a head pointer of the queue head list according to the first-type node; or if the target queue is not empty, write the slice information of the tail slice into the target queue, add the first-type node to a tail of a queue linked sublist corresponding to the target queue, and update a tail pointer of the queue tail list according to the first-type node.

In some embodiments of the present disclosure, the enqueuing processing circuit 520 is further configured to: in the process of enqueuing the corresponding slice information, if the slice is not marked with the tail slice identifier, determine that the slice is a non-tail slice of the data packet, and generate a second-type node, where the second-type node points to a buffer address of slice information of the non-tail slice, and the non-tail slice is another slice in the data packet other than the last slice; and determine whether the target queue is empty, and if the target queue is empty, write the slice information of the non-tail slice into the target queue, and update the head pointer of the queue head list according to the second-type node; or if the target queue is not empty, write the slice information of the non-tail slice into the target queue, add the second-type node to the tail of the queue linked sublist corresponding to the target queue, and update the tail pointer of the queue tail list according to the second-type node.

Further, the queue head list further includes queue indication information, and the enqueuing processing circuit 520 is configured to: read queue indication information from a queue head list corresponding to the target queue, and determine, according to the queue indication information, whether the target queue is empty.

In some embodiments of the present disclosure, the enqueuing processing circuit 520 is further configured to: if the target queue is empty, after the slice information of the tail slice is written into the target queue or the slice information of the non-tail slice is written into the target queue, update the queue indication information, and send a dequeuing request message to a scheduler in the queue management system, where the dequeuing request message includes a queue number.

In some embodiments of the present disclosure, the enqueuing processing circuit 520 is further configured to: update the tail pointer of the queue tail list according to the first-type node after the slice information of the tail slice is written into the target queue, and update the tail pointer of the queue tail list according to the second-type node after the slice information of the non-tail slice is written into the target queue.

Figure 6:
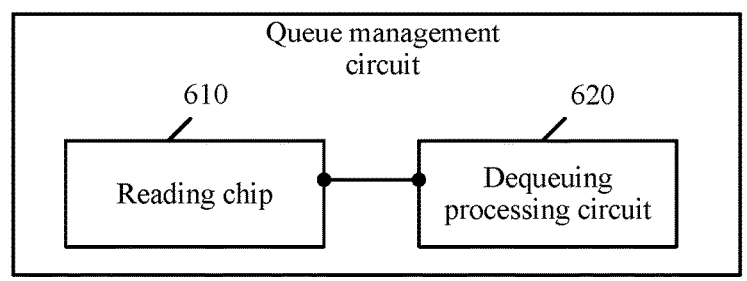
FIG. 6 is a schematic structural diagram of a queue management circuit according to some other embodiments of the present disclosure.

FIG. 6 is a schematic structural diagram of a queue management circuit according to some other embodiments of the present disclosure. As shown in FIG. 6, the queue management circuit may include: a reading chip 610 and a dequeuing processing circuit 620.

The reading chip 610 is configured to read a head pointer of a queue head list of a target queue from several queues of a current communications port, where slice information of a slice is written in the queue, the slice is obtained by dividing a data packet, a tail slice of the data packet is marked with a tail slice identifier, and the slice information includes at least a port number, a priority, and a buffer address of the slice in a memory; and the head pointer points to a first-type node or a second-type node, the first-type node points to a buffer address of slice information of the tail slice and the tail slice identifier of the tail slice, the second-type node points to a buffer address of slice information of a non-tail slice of the data packet, the tail slice identifier is used to indicate that the tail slice is the last slice of the data packet, and the non-tail slice is another slice in the data packet other than the last slice.

The dequeuing processing circuit 620 is configured to: if it is determined that the head pointer points to the first-type node, read the slice information of the tail slice from the target queue according to the buffer address, to which the first-type node points, of the slice information of the tail slice, and trigger queue priority switching of the current communications port after reading of the slice information of the tail slice is completed.

In some implementable manners of the present disclosure, the dequeuing processing circuit 620 is further configured to: if it is determined that the head pointer points to the second-type node, read the slice information of the non-tail slice from the target queue according to the buffer address, to which the second-type node points, of the slice information of the non-tail slice, and trigger queue priority switching of the current communications port after reading of the slice information of the non-tail slice is completed.

In some implementable manners of the present disclosure, the dequeuing processing circuit 620 is further configured to: after reading of the slice information of the tail slice is completed or reading of the slice information of the non-tail slice is completed, read a next node from a queue linked sublist corresponding to the target queue, and update the head pointer of the queue head list according to the next node, where the next node is the first-type node or the second-type node.

In some implementable manners of the present disclosure, the dequeuing processing circuit 620 is further configured to: before the head pointer of the queue head list of the target queue is read from the several queues of the current communications port, receive a dequeuing notification message sent by a scheduler, where the dequeuing notification message includes a queue number, and a queue indicated by the queue number is the target queue.

In some implementable manners of the present disclosure, the dequeuing processing circuit 620 is configured to: when a scheduling time of a communications port arrives, trigger the scheduler to schedule a corresponding communications port according to a configured timeslot, and read latest dequeuing information of the corresponding communications port in previous dequeuing, where the latest dequeuing information includes at least a latest dequeued queue number, latest dequeued slice information, and a node used for dequeuing the latest dequeued slice information that are of the corresponding communications port in the previous dequeuing; and the scheduler determines, according to the latest dequeuing information, whether to trigger queue priority switching of the current communications port, and if no, the scheduler sends a dequeuing notification request to the queue management circuit, where a queue number included in the dequeuing notification request is the latest dequeued queue number, or if yes, the scheduler triggers queue priority switching of the current communications port.

In some implementable manners of the present disclosure, the dequeuing processing circuit 620 is configured to trigger the scheduler to: determine a highest-priority queue from non-empty queues of the current communications port, switch the target queue to the highest-priority queue, and send the dequeuing notification message.

Figure 7:
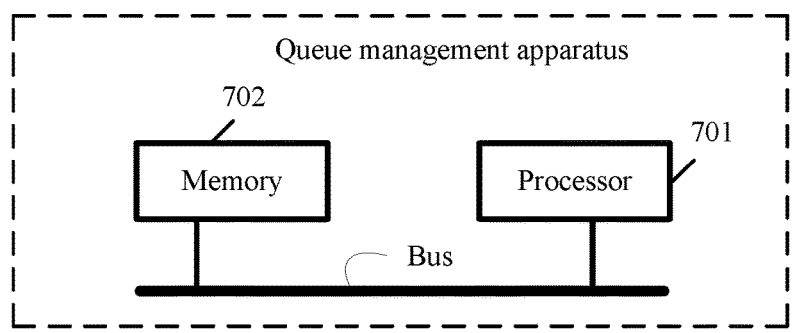
FIG. 7 is a schematic structural diagram of a queue management apparatus according to some embodiments of the present disclosure.

FIG. 7 is a schematic structural diagram of a queue management apparatus according to an embodiment of the present disclosure. The apparatus may include at least one processor 701 (for example, a CPU, Central Processing Unit), at least one network interface or another communications interface, a memory 702, and at least one communications bus configured to implement connection and communication between these apparatuses. The processor 701 is configured to execute an executable module, such as a computer program, stored in the memory. The memory 702 may include a high-speed random access memory (RAM, Random Access Memory), and may further include a non-volatile memory (non-volatile memory), such as at least one magnetic disk memory. Communication and connection between a system gateway and at least one other network element are implemented by using the at least one network interface (which may be wired or wireless) on the Internet, a wide area network, a local area network, a metropolitan area network, or the like.

As shown in FIG. 7, in some implementations, the memory 702 stores a program instruction, and the program instruction may be executed by the processor 701. The processor 701 specifically performs the following steps: receiving a to-be-enqueued data packet, dividing the data packet into several slices to obtain slice information of the slices, and marking a tail slice of the data packet with a tail slice identifier, where the slice information includes at least a port number, a priority, and a buffer address of the slice in a memory, and the tail slice identifier is used to indicate that the tail slice is the last slice of the data packet; enqueuing corresponding slice information according to an order of the slices in the data packet, and in a process of enqueuing the corresponding slice information, if the slice is marked with the tail slice identifier, determining that the slice is the tail slice of the data packet, and generating a first-type node, where the first-type node points to a buffer address of slice information of the tail slice and the tail slice identifier of the tail slice; and determining whether a target queue is empty, and if the target queue is empty, writing the slice information of the tail slice into the target queue, and updating a head pointer of the queue head list according to the first-type node; or if the target queue is not empty, writing the slice information of the tail slice into the target queue, and adding the first-type node to a tail of a queue linked sublist corresponding to the target queue.

Alternatively, the processor 701 specifically performs the following steps: reading a head pointer of a queue head list of a target queue from several queues of a current communications port, where slice information of a slice is written in the queue, the slice is obtained by dividing a data packet, a tail slice of the data packet is marked with a tail slice identifier, and the slice information includes at least a port number, a priority, and a buffer address of the slice in a memory; and the head pointer points to a first-type node or a second-type node, the first-type node points to a buffer address of slice information of the tail slice and the tail slice identifier of the tail slice, the second-type node points to a buffer address of slice information of a non-tail slice of the data packet, the tail slice identifier is used to indicate that the tail slice is the last slice of the data packet, and the non-tail slice is another slice in the data packet other than the last slice; if it is determined that the head pointer points to the first-type node, reading the slice information of the tail slice from the target queue according to the buffer address, to which the first-type node points, of the slice information of the tail slice; and triggering queue priority switching of the current communications port after reading of the slice information of the tail slice is completed.

In some implementations, the processor 701 may further perform the following steps: in the process of enqueuing the corresponding slice information, if the slice is not marked with the tail slice identifier, determining that the slice is a non-tail slice of the data packet, and generating a second-type node, where the second-type node points to a buffer address of slice information of the non-tail slice, and the non-tail slice is another slice in the data packet other than the last slice; and determining whether the target queue is empty, and if the target queue is empty, writing the slice information of the non-tail slice into the target queue, and updating the head pointer of the queue head list according to the second-type node; or if the target queue is not empty, writing the slice information of the non-tail slice into the target queue, and adding the second-type node to the tail of the queue linked sublist corresponding to the target queue.

In some implementations, the processor 701 may further perform the following steps: updating queue status information and queue length information of the target queue, and sending scheduling request information to a scheduler, where the scheduling request information includes a queue number.

In some implementations, the queue head list further includes queue indication information, and the processor 701 may further perform the following steps: reading queue indication information from a queue head list corresponding to the target queue, and determining, according to the queue indication information, whether the target queue is empty.

In some implementations, the processor 701 may further perform the following step: if the target queue is empty, after the slice information of the tail slice is written into the target queue or the slice information of the non-tail slice is written into the target queue, updating the queue indication information.

In some implementations, the processor 701 may further perform the following step: updating a tail pointer of the queue tail list according to the first-type node after the slice information of the tail slice is written into the target queue.

In some implementations, the processor 701 may further perform the following step: updating a tail pointer of the queue tail list according to the second-type node after the slice information of the non-tail slice is written into the target queue.

In some implementations, the processor 701 may further perform the following steps: if it is determined that the head pointer points to the second-type node, reading the slice information of the non-tail slice from the target queue according to the buffer address, to which the second-type node points, of the slice information of the non-tail slice, and triggering queue priority switching of the current communications port after reading of the slice information of the non-tail slice is completed.

In some implementations, the processor 701 may further perform the following steps: after reading of the slice information of the tail slice is completed or reading of the slice information of the non-tail slice is completed, reading a next node from a queue linked sublist corresponding to the target queue, and updating the head pointer of the queue head list according to the next node, where the next node is the first-type node or the second-type node.

In some implementations, the processor 701 may further perform the following step: receiving a dequeuing notification message sent by a scheduler, where the dequeuing notification message includes a queue number, and a queue indicated by the queue number is the target queue.

In some implementations, the processor 701 may further perform the following steps: when a scheduling time of a communications port arrives, triggering the scheduler to schedule a corresponding communications port according to a configured timeslot, and reading latest dequeuing information of the corresponding communications port in previous dequeuing, where the latest dequeuing information includes at least a latest dequeued queue number, latest dequeued slice information, and a node used for dequeuing the latest dequeued slice information that are of the corresponding communications port in the previous dequeuing; and the scheduler determines, according to the latest dequeuing information, whether to trigger queue priority switching of the current communications port, and if no, the scheduler sends a dequeuing notification request to the queue management circuit, where a queue number included in the dequeuing notification request is the latest dequeued queue number, or if yes, the scheduler triggers queue priority switching of the current communications port.

In some implementations, the processor 701 may further perform the following step: triggering the scheduler to: determine a highest-priority queue from non-empty queues of the current communications port, switch the target queue to the highest-priority queue, and send the dequeuing notification message.

In the foregoing embodiments, the description of each embodiment has respective focuses. For a part that is not described in detail in an embodiment, refer to related descriptions in other embodiments.

It may be clearly understood by a person skilled in the art that, for the purpose of convenient and brief description, for a specific working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in a form of a software product. The software product is stored in a storage medium and includes several instructions for instructing a computer device (which may be a personal computer, a server, a network device, or the like) to perform all or some of the steps of the methods described in the embodiments of the present disclosure. The storage medium includes any medium that can store program code, such as a USB flash drive, a removable hard disk, a read-only memory (ROM), a random access memory (RAM), a magnetic disk, or an optical disc.

The foregoing describes in detail a data enqueuing method, a data dequeuing method, and a queue management circuit provided in the present disclosure, and a person of ordinary skill in the art may make variations to specific implementations and the application scope without departing from the idea of the embodiments of the present disclosure. In conclusion, the content of this specification shall not be understood as a limitation on the present disclosure.

What is claimed is:

1. A data enqueuing method, applied to a queue management circuit in a queue management system of a communications processing chip, wherein several queues, a queue head list, a queue tail list, and a total queue linked list are established in the queue management system, the total queue linked list comprises several queue linked sublists, each queue is corresponding to a queue head list, a queue tail list, and a queue linked sublist, the queue head list comprises at least a head pointer, and the queue tail list comprises at least a tail pointer; several communications ports are further disposed on the communications processing chip, and each communications port is corresponding to at least two queues; and the method comprises:

receiving a to-be-enqueued data packet, dividing the data packet into several slices to obtain slice information of the slices, and marking a tail slice of the data packet with a tail slice identifier, wherein the slice information comprises at least a port number, a priority, and a buffer address of the slice in a memory, and the tail slice identifier is used to indicate that the tail slice is the last slice of the data packet;

enqueuing corresponding slice information according to an order of the slices in the data packet, and in a process of enqueuing the corresponding slice information, when the slice is marked with the tail slice identifier, determining that the slice is the tail slice of the data packet, and generating a first-type node, wherein the first-type node points to a buffer address of slice information of the tail slice and the tail slice identifier of the tail slice; and determining whether a target queue is empty;

when the target queue is empty, writing the slice information of the tail slice into the target queue, and updating the head pointer of the queue head list according to the first-type node; and when the target queue is not empty, writing the slice information of the tail slice into the target queue, and adding the first-type node to a tail of a queue linked sublist corresponding to the target queue.

2. The method according to claim 1, further comprising:
in the process of enqueuing the corresponding slice information, when the slice is not marked with the tail slice identifier, determining that the slice is a non-tail slice of the data packet, and generating a second-type node, wherein the second-type node points to a buffer address of slice information of the non-tail slice, and the non-tail slice is another slice in the data packet other than the last slice.

3. The method according to claim 1, wherein the queue head list further comprises queue indication information, and the determining whether a target queue is empty comprises:
reading queue indication information from a queue head list corresponding to the target queue, and determining, according to the queue indication information, whether the target queue is empty.

4. The method according to claim 3, wherein the method further comprises:
when the target queue is empty, after the slice information of the tail slice is written into the target queue or the slice information of the non-tail slice is written into the target queue, updating the queue indication information.

5. The method according to claim 1, wherein the method further comprises:
updating the tail pointer of the queue tail list according to the first-type node after the slice information of the tail slice is written into the target queue.

6. The method according to claim 2, further comprising:
determining whether the target queue is empty, and when the target queue is empty, writing the slice information of the non-tail slice into the target queue, and updating the head pointer of the queue head list according to the second-type node; and
when the target queue is not empty, writing the slice information of the non-tail slice into the target queue, and adding the second-type node to the tail of the queue linked sublist corresponding to the target queue.

7. The method according to claim 6, wherein the method further comprises:
updating the tail pointer of the queue tail list according to the second-type node after the slice information of the non-tail slice is written into the target queue.

8. A queue management circuit, wherein the queue management circuit is disposed in a queue management system of a communications processing chip, several queues, a queue head list, a queue tail list, and a total queue linked list are established in the queue management system, the total queue linked list comprises several queue linked sublists, each queue is corresponding to a queue head list, a queue tail list, and a queue linked sublist, the queue head list comprises at least a head pointer, and the queue tail list comprises at least a tail pointer; several communications ports are further disposed on the communications processing chip, and each communications port is corresponding to at least two queues; and the queue management circuit comprises:
a receiver, configured to: receive a to-be-enqueued data packet, divide the data packet into several slices to obtain slice information of the slices, and mark a tail slice of the data packet with a tail slice identifier, wherein the slice information comprises at least a port number, a priority, and a buffer address of the slice in a memory, and the tail slice identifier is used to indicate that the tail slice is the last slice of the data packet; and
an enqueuing processing circuit, configured to: enqueue corresponding slice information according to an order of the slices in the data packet, and in a process of enqueuing the corresponding slice information, when the slice is marked with the tail slice identifier, determine that the slice is the tail slice of the data packet, and generate a first-type node, wherein the first-type node points to a buffer address of slice information of the tail slice and the tail slice identifier of the tail slice; and determine whether a target queue is empty, and when the target queue is empty, write the slice information of the tail slice into the target queue, and update the head pointer of the queue head list according to the first-type node; or when the target queue is not empty, write the slice information of the tail slice into the target queue, add the first-type node to a tail of a queue linked sublist corresponding to the target queue, and update the tail pointer of the queue tail list according to the first-type node.

9. The queue management circuit according to claim 8, wherein
the enqueuing processing circuit is further configured to:
in the process of enqueuing the corresponding slice information, when the slice is not marked with the tail slice identifier, determine that the slice is a non-tail slice of the data packet, and generate a second-type node, wherein the second-type node points to a buffer address of slice information of the non-tail slice, and the non-tail slice is another slice in the data packet other than the last slice; and determine whether the target queue is empty, and when the target queue is empty, write the slice information of the non-tail slice into the target queue, and update the head pointer of the queue head list according to the second-type node; or when the target queue is not empty, write the slice information of the non-tail slice into the target queue, add the second-type node to the tail of the queue linked sublist corresponding to the target queue, and update the tail pointer of the queue tail list according to the second-type node.

10. The queue management circuit according to claim 8, wherein
the queue head list further comprises queue indication information, and the enqueuing processing circuit is configured to: read queue indication information from a queue head list corresponding to the target queue, and determine, according to the queue indication information, whether the target queue is empty.

11. The queue management circuit according to claim 10, wherein
the enqueuing processing circuit is further configured to: when the target queue is empty, after the slice information of the tail slice is written into the target queue or the slice information of the non-tail slice is written into the target queue, update the queue indication information, and send a dequeuing request message to a scheduler in the queue management system, wherein the dequeuing request message comprises a queue number.

12. The queue management circuit according to claim 8, wherein
the enqueuing processing circuit is further configured to update the tail pointer of the queue tail list according to the first-type node after the slice information of the tail slice is written into the target queue.

13. The queue management circuit according to claim 9, wherein
the enqueuing processing circuit is further configured to update the tail pointer of the queue tail list according to the second-type node after the slice information of the non-tail slice is written into the target queue.

14. A queue management circuit, wherein the queue management circuit is disposed in a queue management system of a communications processing chip, several queues, a queue head list, a queue tail list, and a total queue linked list are established in the queue management system, the total queue linked list comprises several queue linked sublists, each queue is corresponding to a queue head list, a queue tail list, and a queue linked sublist, the queue head list comprises at least a head pointer, and the queue tail list comprises at least a tail pointer; several communications ports are further disposed on the communications processing chip, and each communications port is corresponding to at least two queues; and the queue management circuit comprises:

a reading chip, configured to read a head pointer of a queue head list of a target queue from several queues of a current communications port, wherein slice information of a slice is written in the queue, the slice is obtained by dividing a data packet, a tail slice of the data packet is marked with a tail slice identifier, and the slice information comprises at least a port number, a priority, and a buffer address of the slice in a memory; and the head pointer points to a first-type node or a second-type node, the first-type node points to a buffer address of slice information of the tail slice and the tail slice identifier of the tail slice, the second-type node points to a buffer address of slice information of a non-tail slice of the data packet, the tail slice identifier is used to indicate that the tail slice is the last slice of the data packet, and the non-tail slice is another slice in the data packet other than the last slice; and a dequeuing processing circuit, configured to: when it is determined that the head pointer points to the first-type node, read the slice information of the tail slice from the target queue according to the buffer address, to which the first-type node points, of the slice information of the tail slice, and trigger queue priority switching of the current communications port after reading of the slice information of the tail slice is completed.

15. The queue management circuit according to claim 14, wherein the dequeuing processing circuit is further configured to: when it is determined that the head pointer points to the second-type node, read the slice information of the non-tail slice from the target queue according to the buffer address, to which the second-type node points, of the slice information of the non-tail slice, and trigger queue priority switching of the current communications port after reading of the slice information of the non-tail slice is completed.

16. The queue management circuit according to claim 14, wherein the dequeuing processing circuit is further configured to: after reading of the slice information of the tail slice is completed or reading of the slice information of the non-tail slice is completed, read a next node from a queue linked sublist corresponding to the target queue, and update the head pointer of the queue head list according to the next node, wherein the next node is the first-type node or the second-type node.

17. The queue management circuit according to claim 14, wherein the dequeuing processing circuit is further configured to: before the head pointer of the queue head list of the target queue is read from the several queues of the current communications port, receive a dequeuing notification message sent by a scheduler, wherein the dequeuing notification message comprises a queue number, and a queue indicated by the queue number is the target queue.

18. The queue management circuit according to claim 17, wherein the dequeuing processing circuit is configured to: when a scheduling time of a communications port arrives, trigger the scheduler to schedule a corresponding communications port according to a configured timeslot, and read latest dequeuing information of the corresponding communications port in previous dequeuing, wherein the latest dequeuing information comprises at least a latest dequeued queue number, latest dequeued slice information, and a node used for dequeuing the latest dequeued slice information that are of the corresponding communications port in the previous dequeuing; and the scheduler determines, according to the latest dequeuing information, whether to trigger queue priority switching of the current communications port, and if no, the scheduler sends a dequeuing notification request to the queue management circuit, wherein a queue number comprised in the dequeuing notification request is the latest dequeued queue number, or if yes, the scheduler triggers queue priority switching of the current communications port.

19. The queue management circuit according to claim 18, wherein the dequeuing processing circuit is configured to trigger the scheduler to: determine a highest-priority queue from non-empty queues of the current communications port, switch the target queue to the highest-priority queue, and send the dequeuing notification message.

* * * * *